United States Patent
Eidsmore

(10) Patent No.: US 8,944,516 B2
(45) Date of Patent: Feb. 3, 2015

(54) CARGO HAULING SYSTEM

(76) Inventor: Paul G. Eidsmore, Santa Cruz, CA (US)

( * ) Notice: Subject to any disclaimer, the term of this patent is extended or adjusted under 35 U.S.C. 154(b) by 0 days.

(21) Appl. No.: 13/359,387

(22) Filed: Jan. 26, 2012

(65) Prior Publication Data

US 2013/0193742 A1     Aug. 1, 2013

(51) Int. Cl.
     *B60D 1/00*            (2006.01)
(52) U.S. Cl.
     USPC .......................................... 298/1 A; 280/506
(58) Field of Classification Search
     USPC .......................................................... 298/1 A
     See application file for complete search history.

(56) References Cited

U.S. PATENT DOCUMENTS

| | | |
|---|---|---|
| 1,256,390 A | 2/1918 | Stuart |
| 2,615,586 A | 10/1952 | Miller et al. |
| 3,687,314 A | 8/1972 | Haugland |
| 3,726,423 A | 4/1973 | Miron |
| 3,768,673 A | 10/1973 | Nydam et al. |
| 3,777,921 A | 12/1973 | Nelson |
| 3,837,663 A | 9/1974 | Ness |
| 3,877,594 A | 4/1975 | Coakley |
| 4,034,716 A | 7/1977 | Fleming |
| 4,467,668 A | 8/1984 | Tatch |
| 4,516,902 A | 5/1985 | Matson |
| 4,624,619 A | 11/1986 | Uher |
| 4,635,835 A | 1/1987 | Cole |
| 4,813,841 A | 3/1989 | Eischen |
| 4,856,929 A | 8/1989 | Smahlik et al. |
| 5,085,326 A | 2/1992 | Russell |
| 5,100,280 A | 3/1992 | George, Jr. |
| 5,169,201 A | 12/1992 | Gower |
| 5,184,913 A | 2/1993 | Meriwether |
| 5,213,464 A | 5/1993 | Nicholson et al. |
| 5,244,133 A * | 9/1993 | Abbott et al. ................. 224/521 |
| 5,281,075 A | 1/1994 | Tatman et al. |
| 5,333,888 A * | 8/1994 | Ball ............................. 280/504 |
| 5,393,192 A | 2/1995 | Hall et al. |
| 5,423,566 A * | 6/1995 | Warrington et al. ....... 280/415.1 |
| 5,509,775 A | 4/1996 | Kendall |
| 5,511,928 A | 4/1996 | Ellis |
| 5,564,767 A | 10/1996 | Strepek |
| 5,603,600 A | 2/1997 | Egan et al. |
| 5,636,902 A | 6/1997 | Norbury |
| 5,649,732 A | 7/1997 | Jordan et al. |
| 5,794,291 A | 8/1998 | Olaussen et al. |
| 5,829,945 A | 11/1998 | Stanley |
| 5,839,875 A | 11/1998 | Miller et al. |
| 5,899,466 A | 5/1999 | Twaits, Jr. |
| 5,915,900 A * | 6/1999 | Boltz ........................... 410/110 |
| 5,934,863 A | 8/1999 | Beck |
| 6,076,215 A | 6/2000 | Blankenship et al. |
| 6,077,024 A | 6/2000 | Trueblood |
| 6,099,232 A | 8/2000 | Dixon et al. |
| 6,835,021 B1 * | 12/2004 | McMillan .................. 403/374.4 |
| 6,935,829 B2 | 8/2005 | Smith et al. |
| 6,942,237 B1 * | 9/2005 | Dépault ..................... 280/491.5 |
| 7,033,128 B2 | 4/2006 | Poindexter |
| 8,262,121 B2 * | 9/2012 | Beck ............................. 280/504 |
| 8,308,185 B2 * | 11/2012 | Weaver ........................ 280/506 |

(Continued)

*Primary Examiner* — H Gutman
(74) *Attorney, Agent, or Firm* — Fay Sharpe LLP

(57) ABSTRACT

A cargo hauling system is dimensioned to fit within a bed of a light truck. The bin moves forwardly and rearwardly relative to the truck bed along rollers provided on a tailgate of the truck. The tailgate is modified by reinforcing a perimeter of the tailgate, adding rollers to the tailgate, substituting reinforced linkages and hinges for factory originals, and adding a support member that extends between the trailer hitch and tailgate.

7 Claims, 10 Drawing Sheets

(56) References Cited

U.S. PATENT DOCUMENTS

| | | |
|---|---|---|
| 2002/0114688 A1 | 8/2002 | Poindexter et al. |
| 2002/0136621 A1 | 9/2002 | Scherle |
| 2004/0018076 A1 | 1/2004 | Poindexter |
| 2005/0135908 A1* | 6/2005 | Eidsmore .................. 414/480 |
| 2006/0208456 A1* | 9/2006 | Weaver .................... 280/491.5 |
| 2007/0001473 A1* | 1/2007 | Eidsmore .................. 296/26.08 |
| 2008/0279664 A1* | 11/2008 | Eidsmore .................... 414/480 |
| 2009/0218789 A1* | 9/2009 | Beck ............................ 280/511 |
| 2010/0283225 A1* | 11/2010 | Lahn ........................... 280/506 |
| 2013/0033021 A1* | 2/2013 | Prescott et al. ............... 280/507 |

\* cited by examiner

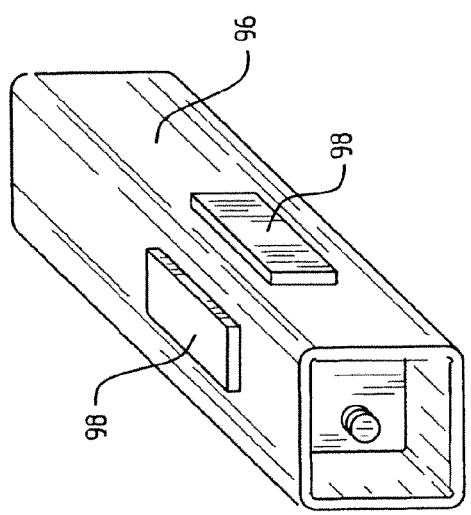
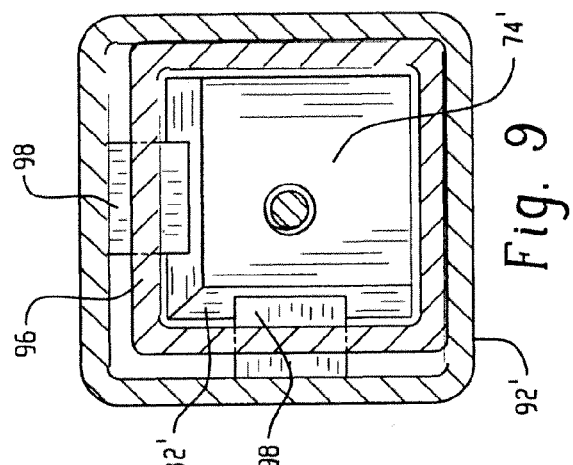
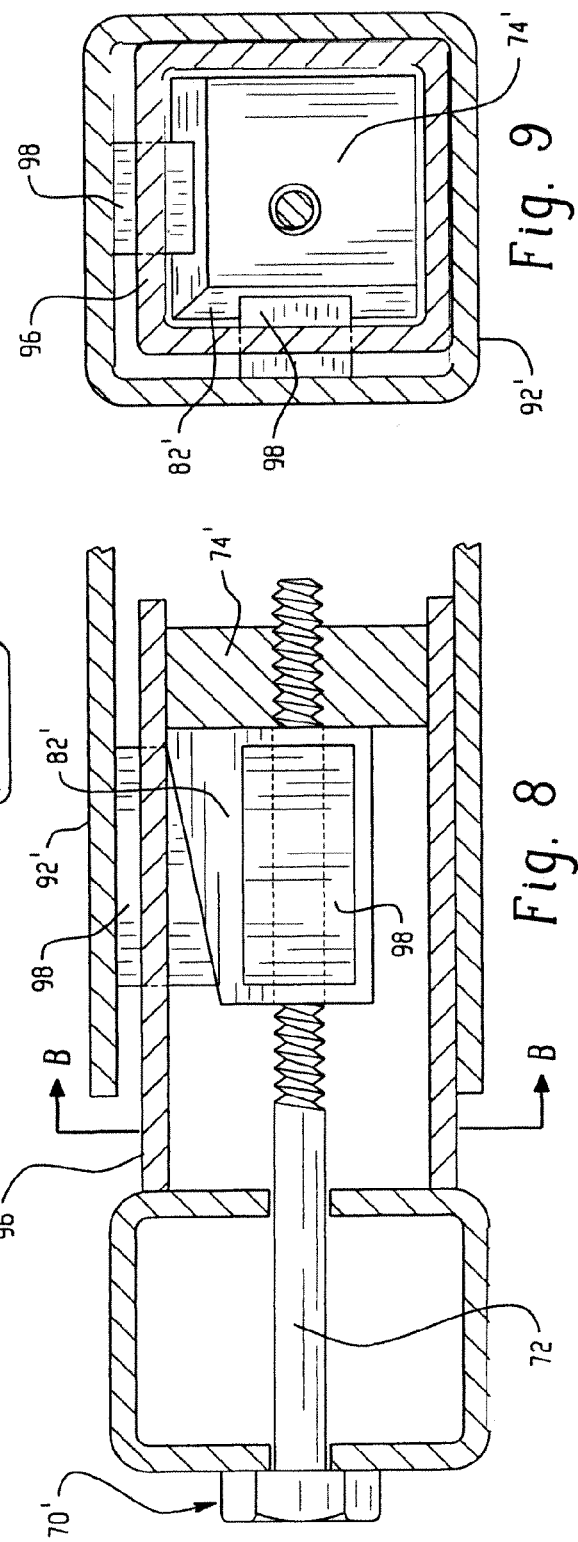

CARGO HAULING SYSTEM

This application claims the priority benefit of U.S. patent application Ser. No. 11/836,605, filed Aug. 9, 2007, which claims priority from Ser. No. 10/881,383, filed Jun. 30, 2004, now abandoned, which claims the benefit of U.S. Provisional Application 60/483,871, filed Jun. 30, 2003, the disclosures of which are incorporated herein by reference.

BACKGROUND OF THE INVENTION

Sales of light trucks and sport utility vehicles (SUV) have steadily grown year after year and recently outsold cars for the first time in history. The demand for these multi-purpose vehicles has led to the creation of numerous makes and models, and also the need for new, innovative accessories that take advantage of the heavy-duty nature of these vehicles.

Light trucks have a truck bed and SUVs typically have a large cargo space for hauling or transporting goods and materials. For example, the truck bed is typically an open topped chamber or cavity in which a rear end is selectively closed by a pivoting or removable tailgate. It is well known to employ truck bed liners, normally a liner that is permanently installed to the interior surface of the truck bed. Similarly, with SUVs, a pivoting hatchback door allows access to a rear storage compartment. Manufacturers provide for fold-down seats to maximize the amount of cargo space available to the user. Unfortunately, these cargo spaces are also a part of the SUV interior and only certain types of materials are conveniently mounted in the rear storage compartment.

It is common to use these light trucks and SUVs for hauling a variety of materials. For example, construction tools, mulch, topsoil, debris, etc. are temporarily stored in the truck bed or SUV cargo space. A need exists, however, for a vehicle bin that maximizes the efficient use of these storage areas. Moreover, a need exists for such an arrangement that can be provided without undue alteration or modification of the truck bed or cargo space of the light truck or SUV.

SUMMARY OF THE INVENTION

The present invention provides a cargo hauling system that is dimensioned to fit the truck bed or SUV cargo space. The bin is adapted to move forwardly and rearwardly relative to the truck bed or cargo space, selectively pivot for dumping the load contents of the bin from the rear of the vehicle, be selectively removed from the vehicle to leave at a job site, and/or allow the vehicle to be used without the removable bin.

The invention includes a pivot arm assembly advantageously mounted to a conventional trailer hitch receiver installed on vehicles of this type. The pivot arm assembly includes a support bar received within the trailer hitch receiver. A generally U-shaped support structure includes a transverse arm and first and second upright arms extending therefrom having first, lower ends secured to the transverse arm. The support structure receives a storage bin, particularly, the bin is adapted for selective sliding and pivoting movement relative to the support structure. First and second rollers are preferably rotatably secured adjacent outer terminal ends of the first and second upright arms, respectively. The rollers cooperate with first and second guide rails secured to an underside of the bin. In addition, roller members are preferably provided along an undersurface of the bin to facilitate rolling movement of relative to the truck bed/cargo space.

A loading, unloading ramp assembly is independently and conveniently secured to the pivot arm assembly. Wheels are preferably provided adjacent an outer terminal end of a ramp and cooperate with a closed loop assembly for selectively loading and unloading the bin from the vehicle along the ramp. The closed loop assembly includes a continuous, flexible drive member such as a chain that passes around a first or idler sprocket located adjacent the pivot arm assembly end of the ramp and about a second or drive sprocket rotatably secured adjacent the outer terminal end of the ramp. The drive sprocket is operatively connected to, i.e., driven by, a chain drive wheel also mounted adjacent the outer terminal end. By using the motive power of the vehicle, the bin is urged by the closed loop chain along the ramp, carried by the chain that is driven by the drive wheel and drive sprocket.

A self-tightening mounting assembly is preferably used to secure the pivot arm assembly to the receiver of the trailer hitch. In one arrangement, the mounting assembly includes first and second members angled in two directions so that as a fastener, such as elongated threaded bolt received through the angled members, is tightened, the angled members securely engage an interior surface of the receiver tube. In another embodiment, a wedge member cooperates with outwardly expanding pads to engage the interior surface of the receiver tube. Either of these self-tightening mounting assemblies limits any loose fit or play between the pivot arm assembly and the trailer hitch receiver.

A primary advantage of the invention is found in an improved cargo hauling system.

One benefit resides in the ability to protect the interior cargo space or truck bed from potential contamination or damage by the material carried in the bin.

Another advantage is found in the ability to selectively remove the bin from the vehicle.

Still another advantage resides in the ease in which the cargo hauling system is mounted to the vehicle via a conventional trailer hitch assembly.

Yet another advantage of the invention results in the self-powered ramp that facilitates installation and removal of the bin from the truck bed or SUV cargo space.

Still other benefits and advantages of the invention will become apparent to those skilled in the art upon reading and understanding the following detailed description.

BRIEF DESCRIPTION OF THE DRAWINGS

FIGS. 7-9 show a perspective, and sectional views thereof of an alternative interconnection of the pivot arm assembly with the trailer hitch assembly.

DETAILED DESCRIPTION OF THE INVENTION

Figure 2:
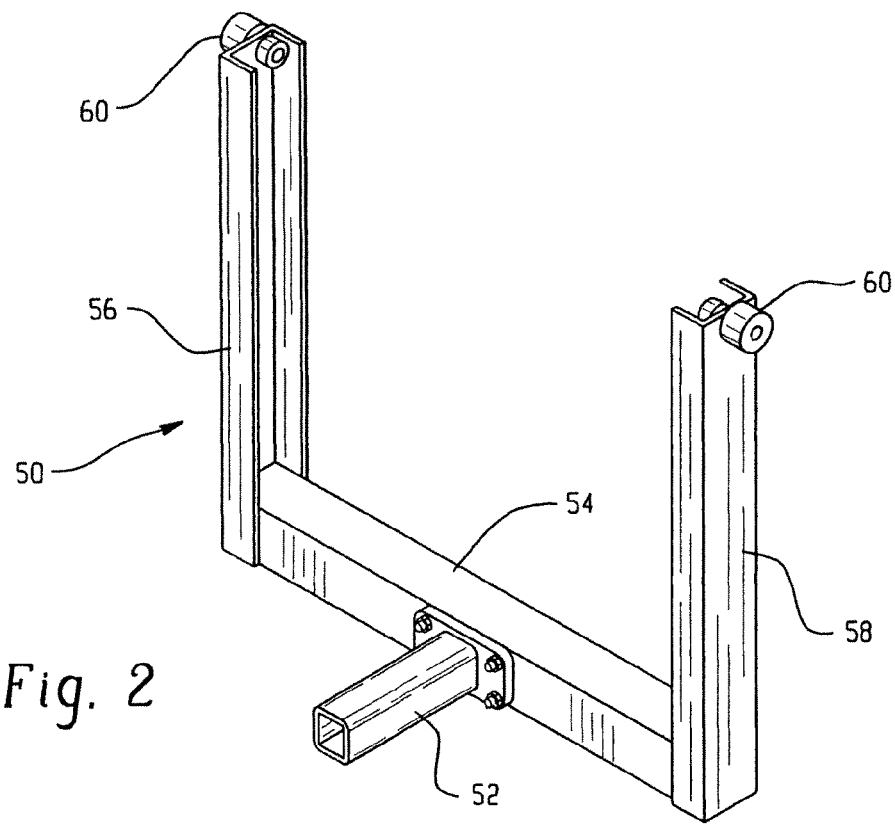
FIG. 2 is a perspective view of a preferred form of pivot arm assembly.
Figure 3:
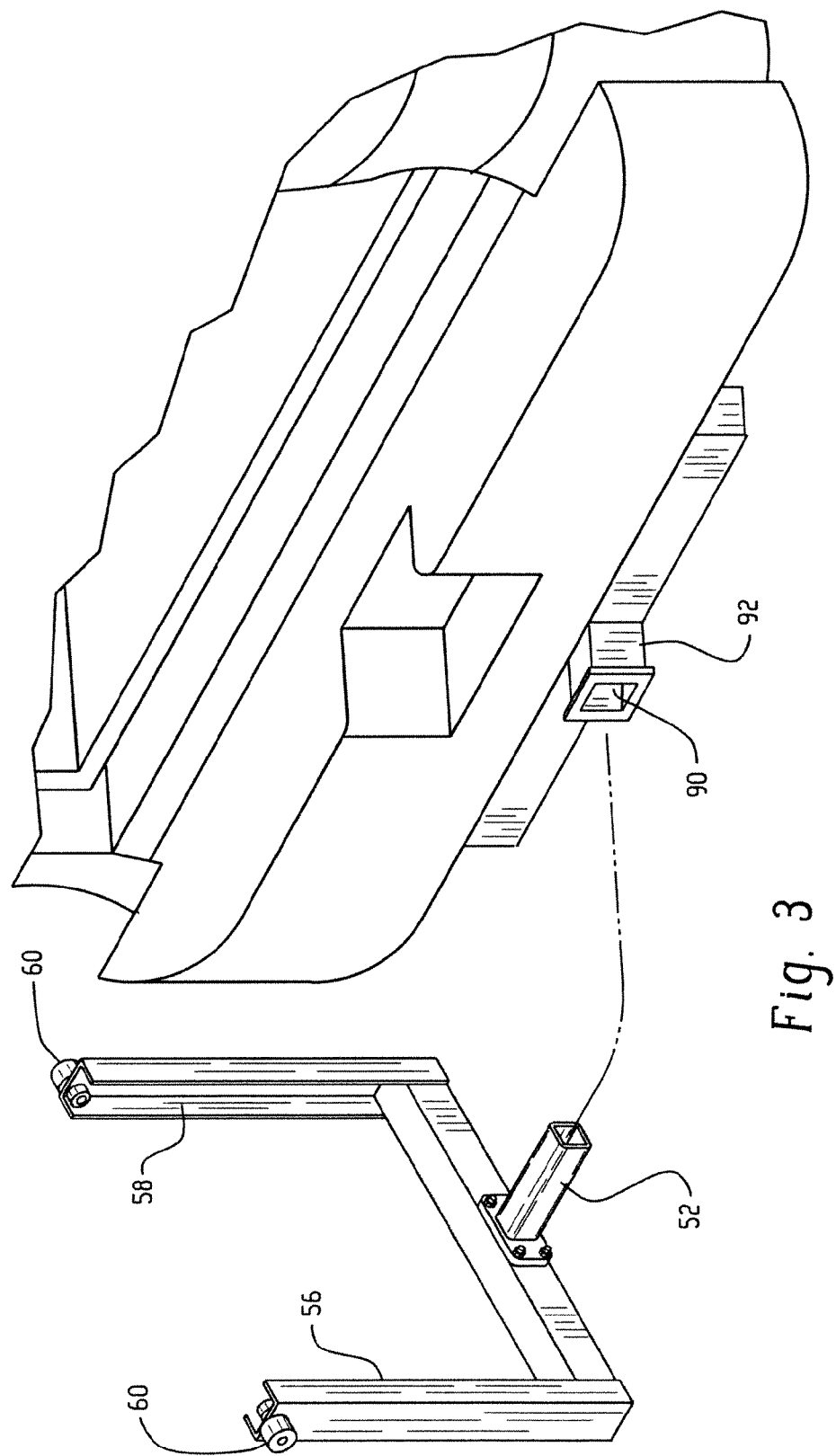
FIG. 3 illustrates installation of the pivot arm assembly of FIG. 2 to a conventional trailer hitch assembly.
Figure 4:
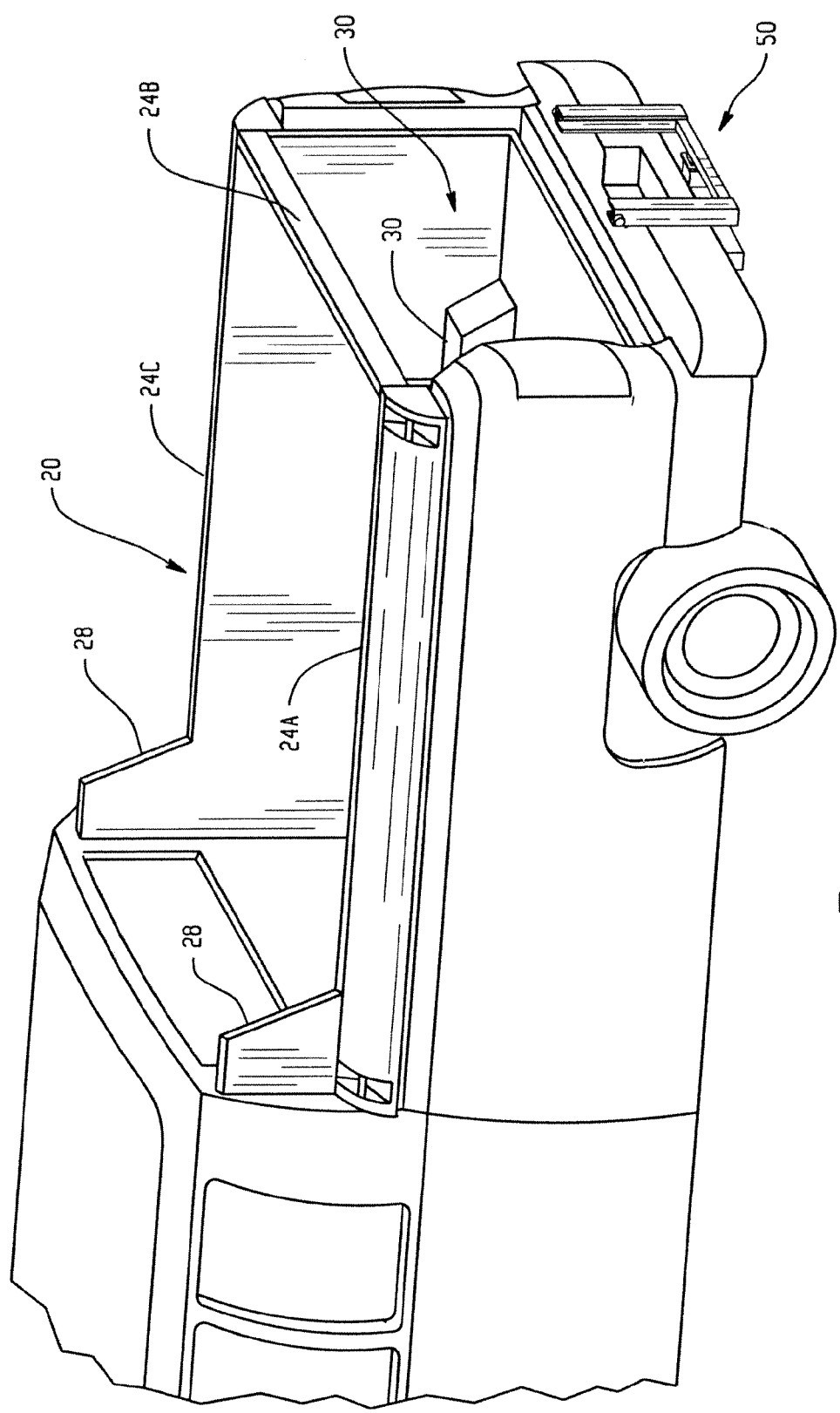
FIG. 4 is an illustration of a bin received in a truck bed with the tailgate removed and the support assembly mounted in place.

Turning to FIGS. 1-4, a prototype of a cargo bin 20 is shown both separated from the associated light truck (FIG. 1) and installed in the bed of a light truck (FIG. 4). More particularly, the bin includes a base wall member 22 and at least first, second and third sidewalls 24a, 24b, 24c that enclose a bin cavity 26. Although not shown, it will be appreciated that an additional sidewall could be provided to close the remaining open side or rear end of the bin, and/or likewise, a top or lid (i.e., removable, hinged, etc.) could also be provided to enclose the upper surface of the bin. Although the prototype is illustrated as formed wood panel portions, commercial units will more likely be formed from a plastic material or composite plastic, for example in conjunction with a durable frame such as an angle iron frame.

The bin is dimensioned for close receipt within the footprint or outline area of the cargo space of an SUV or bed of a light truck. Thus, the precise configuration of a bin may differ slightly from one vehicle to another, although it is generally contemplated that the bin will have a box-like conformation that closely matches that of the volume of the vehicle in which it is received in order to maximize storage volume or capacity.

Figure 1:
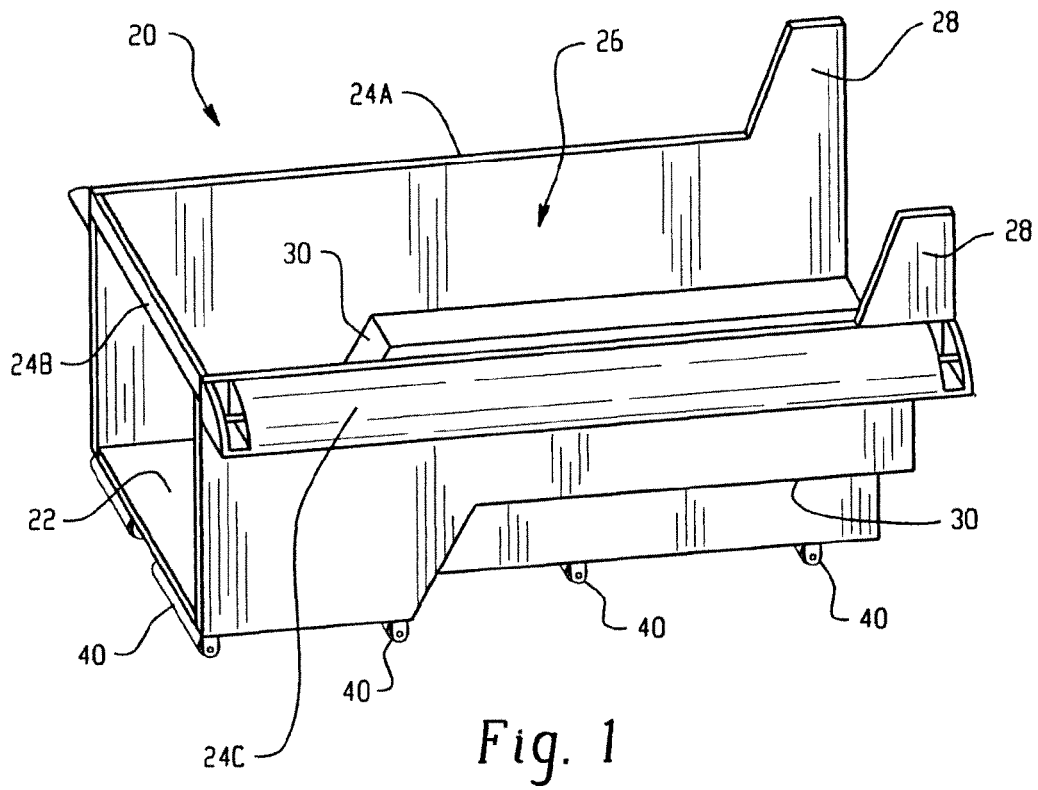
FIG. 1 shows a prototype cargo bin in accordance with the present invention.

As will also be appreciated from FIGS. 1 and 4, the bin may include a transition portion 28 that merges with the roofline, for example, of the vehicle. In other instances, the transition portion will conform to the interior of the cargo space of the SUV or other outline of the truck. Likewise, recessed cutout regions 30 may be provided along lower, opposite edges of the bin sidewalls 24a, 24c in order to accommodate a raised wheel well area in the cargo space or truck bed.

Preferably, the bin is a one-piece, integral unit so that any material stored therein is not inadvertently spilled or released into the truck bed or cargo space of the SUV. Received on a lower surface of the base wall are a series of roller members 40 that facilitate rolling movement of the bin, and particularly the base wall thereof, along the horizontal surface of the associated bed or cargo space, or along the ground surface as will be appreciated from further discussion below. The particular number or spacing of the roller members may vary depending on the size of the bin, intended use, etc.

As illustrated in FIGS. 2 and 3, pivot arm assembly 50 includes a support bar 52 secured to a transverse arm 54, preferably at approximately mid-length of the transverse arm. Outer, terminal ends of the transverse arm are secured to first and second upright arms 56, 58. The upright arms include rollers 60 on the outer terminal ends thereof for reasons, which will become more apparent below. They also include terminal rollers 62. The pivot arm assembly is preferably channel or tube stock and is either welded or fastened together and the transverse arm and first and second upright arms define a generally U-shaped member. The support bar is dimensioned for receipt in the trailer hitch receiver. For example, a conventional two-inch trailer hitch would receive the support bar therein, and a cross pin extending through the trailer hitch member and the support bar secures the pivot arm assembly to the vehicle. The support arms have a dimension that extends upwardly from the transverse arm to the base of the truck bed or cargo space of the SUV. Thus, when mounted in place, for example as illustrated in FIGS. 3 and 5, the arms 56, 58 do not interfere with rear door operation of the SUV, or when used with the tailgate removed on a truck, the arms preferably do not extend above the lower surface of the truck bed.

Figure 5:
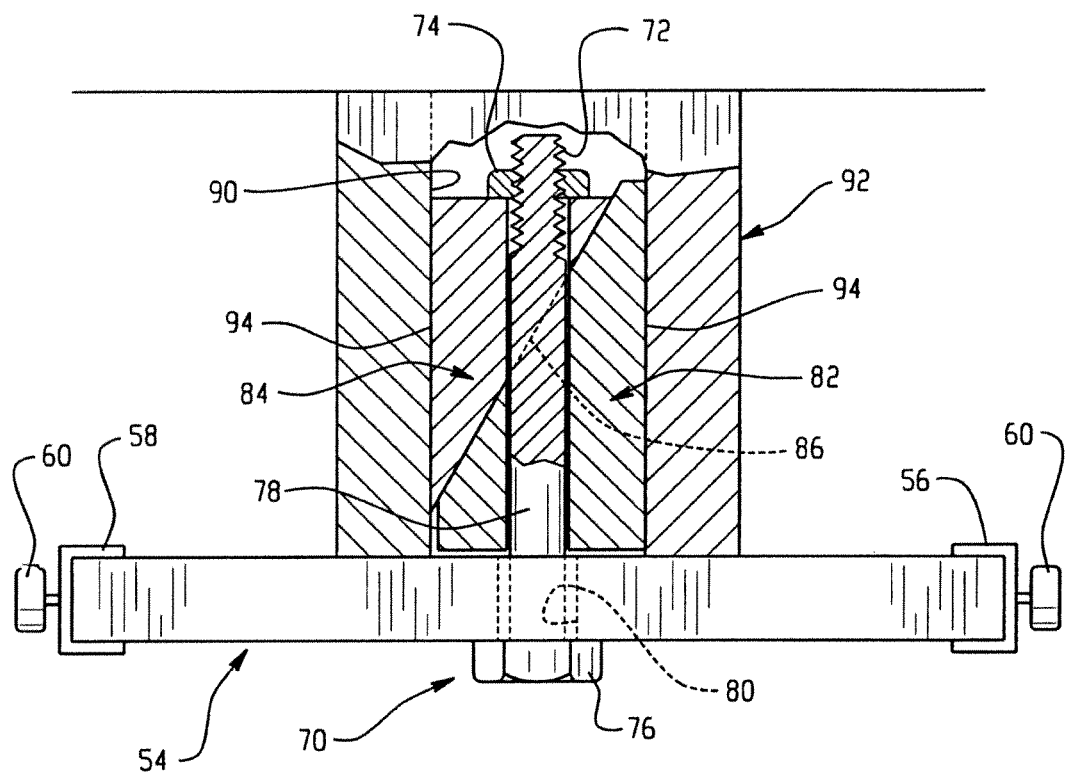
FIG. 5 is a view, partly in cross-section, of the interconnection of the pivot arm assembly with the trailer hitch assembly.
Figure 6:
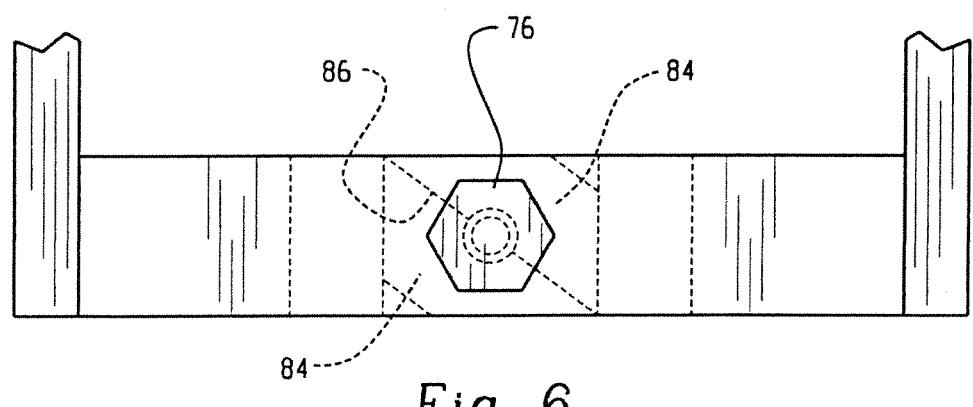
FIG. 6 is a view taken generally along the lines 6-6 of FIG. 5.

Alternatively, and as shown in FIGS. 5 and 6, the pivot arm assembly eliminates the support bar and uses an elongated fastener with a pair of cooperating wedge members to secure the pivot arm assembly to the trailer hitch receiver. Fastener 70 includes external threads 72 at one end that cooperate with a fastening nut 74 and a fastener head or bolt head 76 at the other end preferably has tool-engaging flats. A shank 78 of the fastener is received through an opening 80 in the transverse arm. Likewise, suitable dimensioned openings are provided through first and second wedge members 82, 84 that have selectively mating angled surfaces 86 that allow relative sliding movement as the wedge members are urged into tight gripping engagement with an internal surface 90 of the trailer hitch receiver 92. Thus, as the fastener is rotated in the desired direction, the wedge members are drawn toward one another, in sliding engagement along mating surface 86, and the longitudinal surfaces 94 of the wedge members expand outwardly into tight, securing engagement with the internal surface 90 of the trailer hitch receiver. As will be appreciated from FIGS. 5 and 6, mating surfaces 86 are angled in both the X and Y directions so that tight engagement with the internal surfaces 90 of the receiver is achieved in perpendicular directions, i.e., along the entire inner perimeter of the trailer hitch receiver.

Turning now to FIGS. 7-9, an alternative assembly is shown for securing the pivot arm assembly to the trailer hitch receiver. Where possible, like parts are identified by like reference numbers with a primed suffix, e.g., trailer hitch receiver 92 is identified as receiver 92', and new components by new reference numerals. Particularly, the receiver 92' receives a hollow square tube 96 that includes multiple engaging pads 98 that are selectively moved inwardly and outwardly through corresponding openings in the tube in response to movement of wedge member 82'. The wedge member includes an outer inclined surface that engages the pads and upon selective rotation of the fastener 70', the nut 74' is moved along shaft 72' and moves the pads either inwardly or outwardly relative to the axis of the tube to either release or grippingly engage the inner surface of the trailer hitch receiver. As shown, two pads are provided and oriented to engage inner surfaces disposed at ninety degrees relative to one another in the hitch receiver to assure secure engagement of the pivot arm assembly.

Figure 10A:
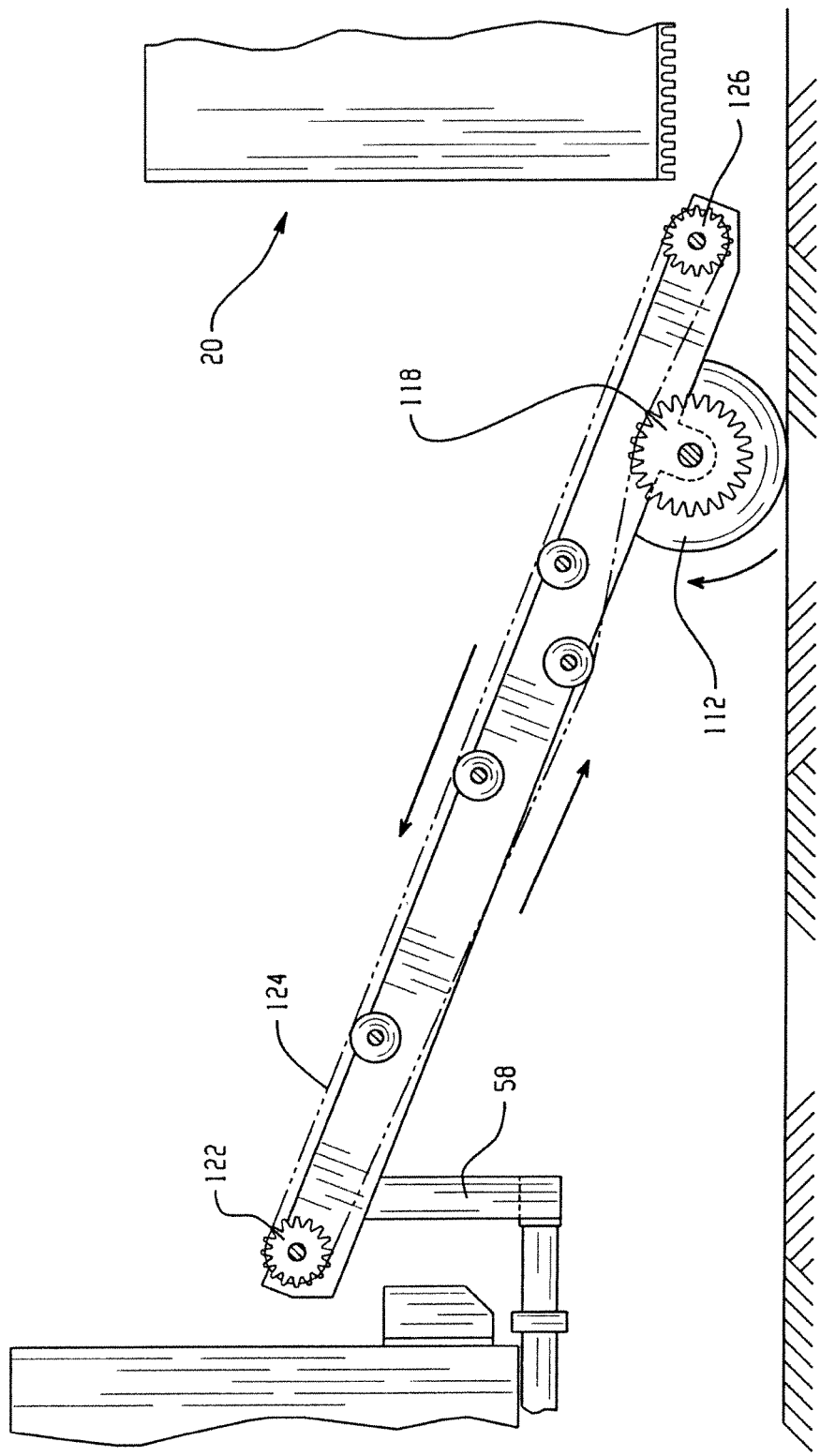
FIGS. 10A and 10B show a ramp assembly extending from the pivot arm assembly to a cargo bin disposed on the ground surface.
Figure 10B:
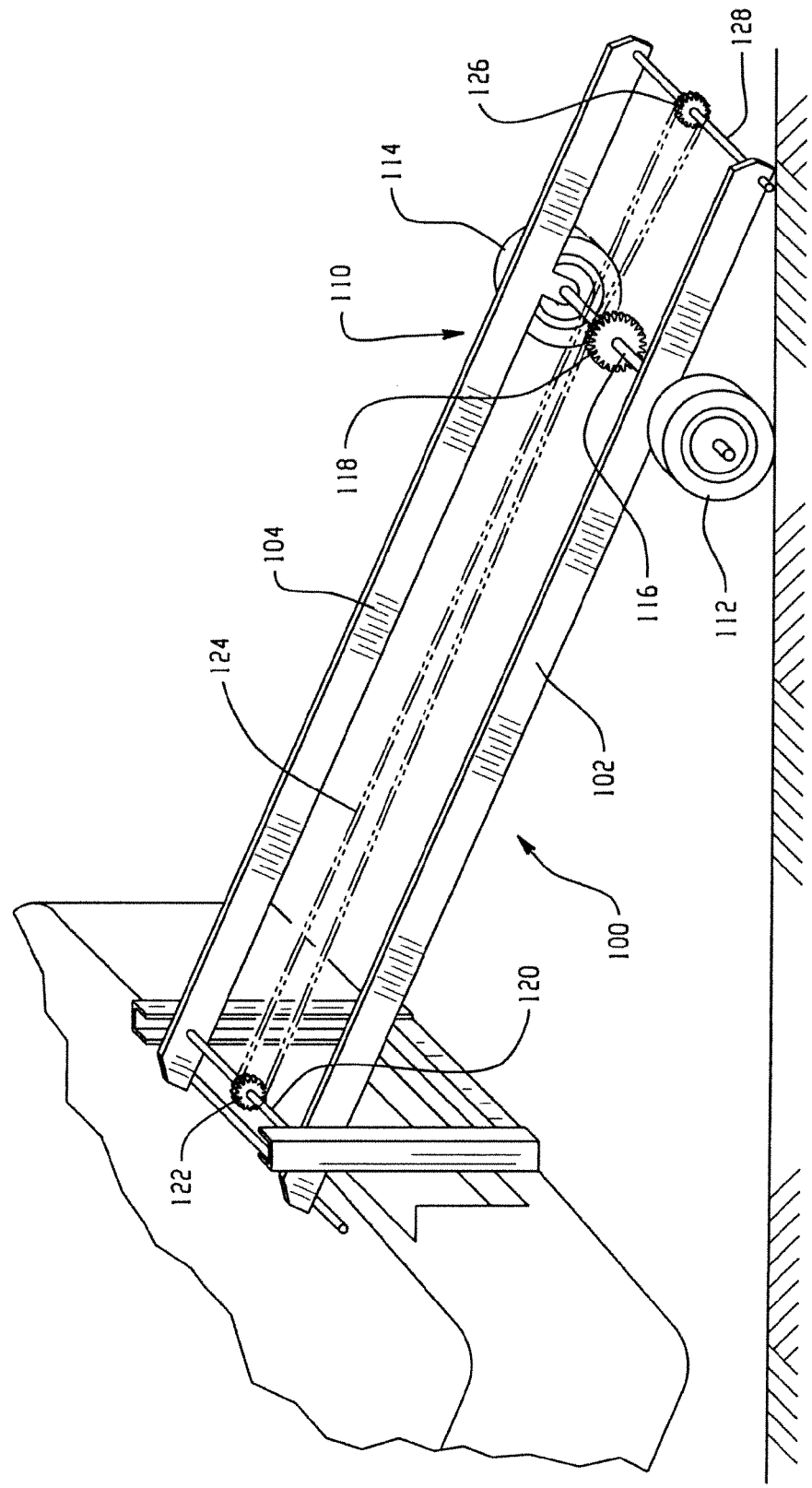
Figure 11:
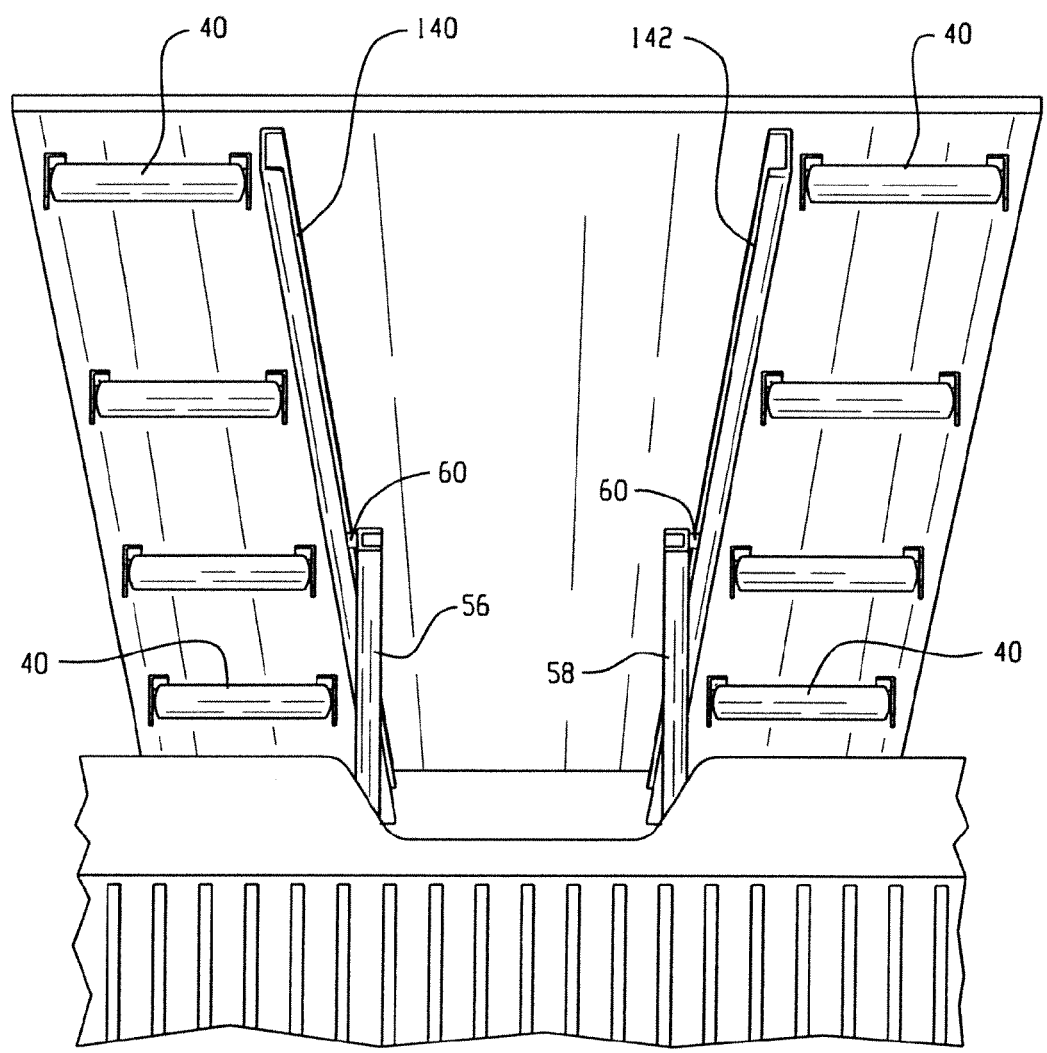
FIG. 11 is a view from a truck bed of the underside of the cargo bin in a dump position.
Figure 12:
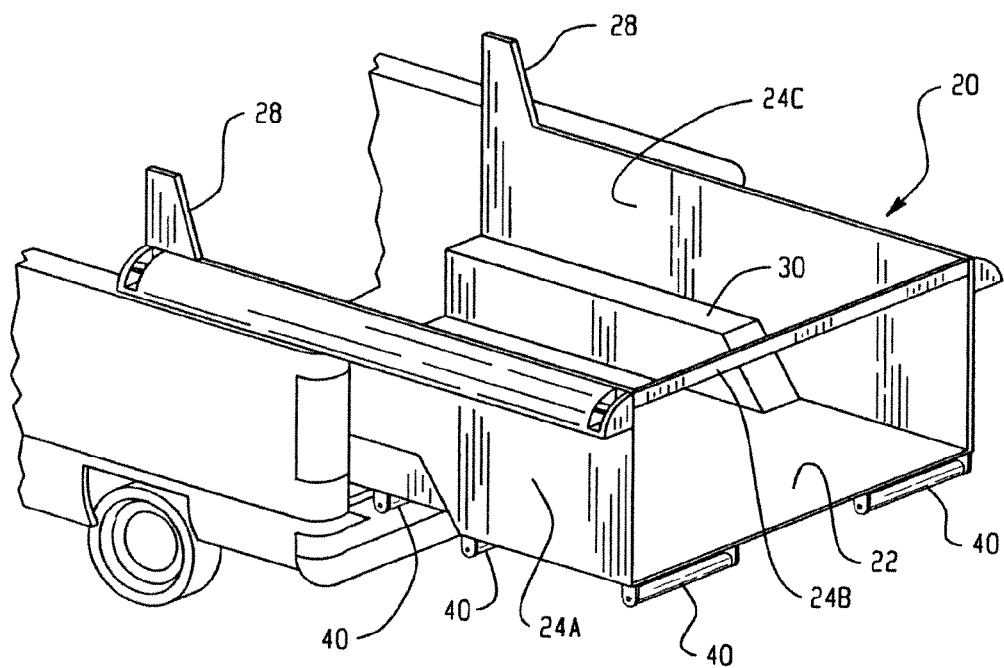
FIG. 12 is a view of the cargo bin shown partially extended from the truck bed.
Figure 13:
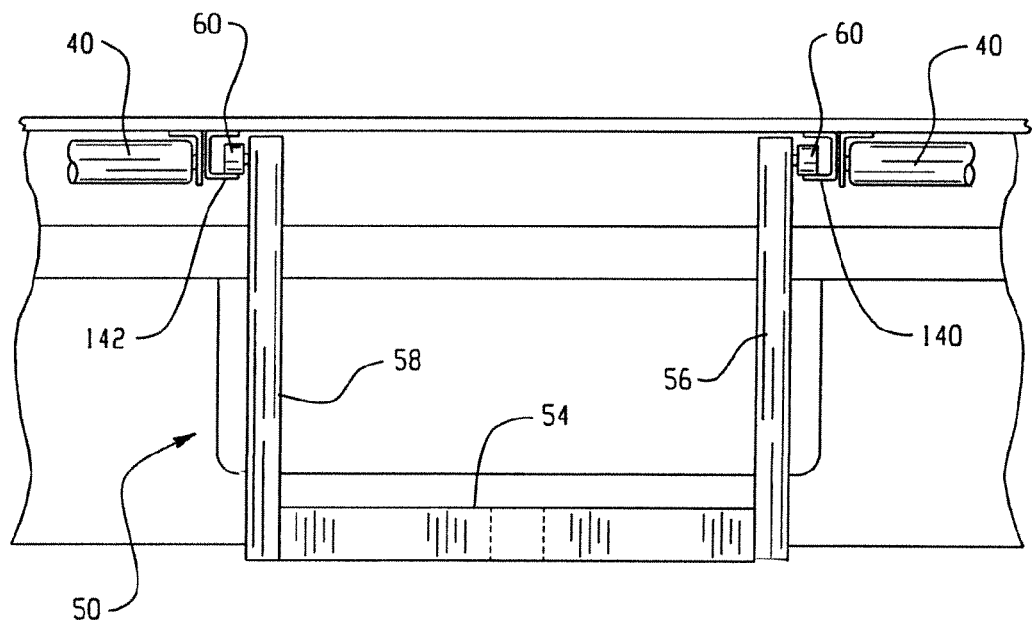
FIG. 13 is an elevational view of the pivot arm assembly in operative association with the underside of the cargo bin.

Referring to FIGS. 10A and 10B, installation of the bin into the truck bed or cargo space is illustrated. A loading/unloading ramp assembly 100 includes first and second support members or ramps 102, 104 that are interconnected adjacent a first end by a wheel assembly 110. The wheel assembly includes first and second wheels 112, 114 interconnected by an axle 116. The axle also receives a sprocket or gear 118 that is secured to the axle. Thus, the gear is adapted to rotate with the axle that, in turn, rotates with the wheels as the wheels roll along the ground surface in response to forward or rearward movement of the vehicle. At a second end of the ramp assembly is a second axle or rotating idler shaft 120 that includes a sprocket or gear 122 mounted thereon. A flexible drive member such as chain 124 defines a continuous loop about the gears 118, 122, and additionally around idler gears 126 rotatably secured to the ramps. In this manner, the motive power of the vehicle is used to pull or haul the bin along the support members 102, 104 and into or out of the truck bed. That is, the assembly is set up as illustrated in FIG. 10. By moving the vehicle in reverse, the chain rotates (generally counterclockwise as shown) to pull the bin upwardly, the driving force being provided through rotation of the wheels 112, 114 via axle 116. As will be appreciated, the reverse situation also advantageously uses the motive power of the vehicle to pull the bin from the truck bed or cargo space.

FIGS. 11-14 illustrate various positions of the bin once it has been loaded into the truck bed. First and second channel members 140, 142 are preferably secured to the bottom surface of the bin to facilitate such movement. The channel members are located inwardly of the roller members 40 in the exemplary embodiment, disposed in parallel relation and for cooperation with respective rollers 60 provided on the upper ends of the upright arms 56, 58. The rollers provide a low friction, roller engagement of the bin with the pivot arm assembly so that the bin can be easily inserted into and withdrawn from the truck bed/cargo space. The intercooperation of the rollers with the channels is perhaps best illustrated in FIG. 13 where the bin is fully installed into a truck bed. Thus, the rollers 60 advancing in the channels, in conjunction with the roller members 40, allow a vehicle operator to easily slide the bin forwardly and rearwardly within the truck bed or cargo space as demonstrated in FIG. 12.

Figure 14:
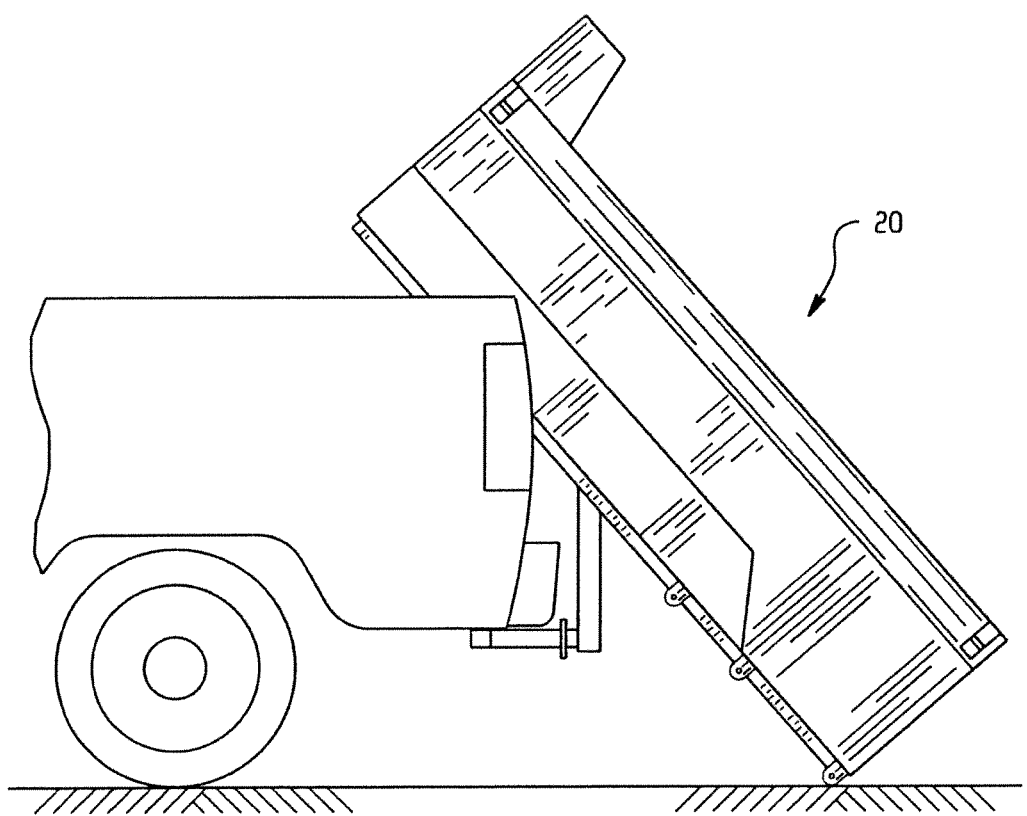
FIG. 14 is a side elevational view of the cargo bin in a dump position.

The material in the bin can also be dumped without removing the bin from the truck. This is illustrated in FIG. 14 where the bin is withdrawn and the center of gravity ultimately allows the bin to pivot along the rollers provided in the upright arms of the pivot arm assembly to a dump position. If topsoil, mulch, or the like needs to be further spread, advancement of the vehicle (leftward as illustrated) allows the remaining contents of the bin to be dumped onto the ground surface. The operator can then easily and manually pivot the bin upwardly and then slide the bin into the truck bed/cargo space.

As will be appreciated, the bin can be completely removed from the vehicle through use of the ramp assembly. Thus, if the bin is filled with constructions materials or tools, it can be transported to a work site, removed from the vehicle, and placed at a desired location on the ground surface where it is chained to a support post, or the like. Once construction is complete or if it becomes necessary to move the bin to another site, the bin is reloaded into the vehicle through use of the ramp assembly of FIG. 10. This allows the vehicle operator to continue to use the vehicle without unnecessarily hauling the materials stored in the bin back and forth to the construction site. On the other hand, the bin can remain installed in the truck bed/cargo space and material or goods stored therein and selectively removed or dumped as illustrated in FIG. 14. In both situations, the interior of the truck bed or SUV is protected through use of the durable material of construction of the bin.

The invention has been described with reference to the preferred embodiment. Obviously, modifications and alterations will occur to others upon a reading and understanding of this specification. The invention is intended to include all such modifications and alterations insofar as they come within the scope of the appended claims or the equivalents thereof.

What is claimed is:

1. A cargo hauling apparatus for an associated motor vehicle, the apparatus comprising:
   a support member;
   a hitch configured for receiving the support member and for mounting the support member to the associated motor vehicle; and
   a self-tightening mounting assembly to mount the support member to the hitch, the self-tightening mounting assembly includes a fastener having a fastener head at a first end and a shank extending therefrom with external threads at a second end;
   a first wedge member including an opening adapted to receive the fastener shank therethrough, the first wedge member further including an angled surface that extends from a first, narrow end to a second, enlarged end configured for receipt in the associated hollow tube of the associated vehicle hitch;
   a second wedge member including an opening adapted to receive the fastener shank therethrough, the second wedge member further including an angled surface that extends from a first, narrow end to a second, enlarged end configured for receipt in the associated hollow tube of the associated vehicle hitch, the angled surface of the second wedge member disposed in facing, sliding engagement with the angled surface of the first wedge member;
   a fastener nut threadably received on the fastener threads and adapted for operative engagement with one end of the first and second wedge members, so that rotation of the fastener relative to the fastener nut in a first direction draws the first and second wedge members toward one another and the angled surfaces selectively expand outwardly in response to the fastener and fastener nut drawing the wedge members toward one another, the angled surfaces of the first and second wedge members selectively expand outwardly in response to the fastener drawing the wedge members toward one another; and
   wherein the self-tightening mounting assembly includes a hollow tube having multiple engaging pads that selectively move inwardly and outwardly through openings in a sidewall of the tube in response to movement of the wedge members to release or engage an inner surface of the hitch.

2. The cargo hauling apparatus according to claim 1, wherein the self-tightening mounting assembly includes openings through the first and second wedge members to receive the fastener.

3. The cargo hauling apparatus according to claim 1, wherein the angled surfaces of the first and second wedge members are adapted to engage an inner surface of the hitch in the perpendicular directions.

4. A cargo hauling apparatus for an associated motor vehicle, the apparatus comprising:
   a support member;
   a hitch configured for receiving the support member and for mounting the support member to the associated motor vehicle; and
   a self-tightening mounting assembly to mount the support member to the hitch, the self-tightening mounting assembly includes a fastener having a fastener head at a first end and a shank extending therefrom with external threads at a second end, a hollow tube having openings in sidewalls of the tube, a first wedge member including an opening adapted to receive the fastener shank therethrough, the first wedge member further including an angled surface that extends from a first, narrow end to a second, enlarged end configured for receipt in the hollow tube, a second wedge member including an opening adapted to receive the fastener shank therethrough, the second wedge member further including an angled surface that extends from a first, narrow end to a second, enlarged end configured for receipt in the hollow tube, the angled surface of the second wedge member disposed in facing, sliding engagement with the angled surface of the first wedge member, and a fastener nut threadably received on the external threads and adapted for operative engagement with one end of the first and second wedge members, so that rotation of the fastener relative to the fastener nut in a first direction draws the first and second wedge members toward one another and the angled surfaces selectively expand outwardly in response to the fastener and fastener nut drawing the wedge members toward one another, and multiple engaging pads that selectively move inwardly and outwardly through the openings in the hollow tube in response to movement of one of the first and second wedge members to release or engage an inner surface of the hitch, wherein at least two of the pads are provided and oriented to engage inner surfaces of the hitch disposed at ninety degrees relative to one another therein.

5. The cargo hauling apparatus according to claim 4, wherein the angled surface of at least one the first and second wedge members is adapted to engage the pads upon selective rotation of the fastener.

6. The mounting assembly of claim 1 wherein the angled surfaces are disposed in abutting, sliding relation with one another.

7. The mounting assembly of claim 1 wherein the first and second wedge members are identical.

* * * * *